United States Patent [19]
Beeman et al.
[11] 3,760,269
[45] Sept. 18, 1973

[54] MULTI-FREQUENCY TONE DETECTOR

[75] Inventors: Robert H. Beeman; Lloyd A. Tarr, both of Berkeley, Ill.

[73] Assignee: GTE Automatic Electric Laboratories Incorporated, Northlake, Ill.

[22] Filed: July 31, 1972

[21] Appl. No.: 285,394

[52] U.S. Cl. ............................... 324/78 D, 324/186
[51] Int. Cl. ......................... G01r 23/02, G04f 9/00
[58] Field of Search .......................... 324/186, 78 D

[56] References Cited
UNITED STATES PATENTS
3,537,001 10/1970 Friend ............................... 324/186

*Primary Examiner*—Alfred E. Smith
*Attorney*—K. Mullerheim et al.

[57] ABSTRACT

A multi-frequency tone detector wherein tone detection is accomplished by timing the interval or period of the input tone signal to determine its frequency. Preferably counting, or timing, is accomplished over more than one period, eight in a preferred embodiment, to reduce the effect of noise. A programmable counter is used, with the count thereof being programmed to establish recognition bandwidth limits. The programmable counter is reset each time it counts to a programmed lower or upper bandwidth limit, thus permitting a smaller counter and less memory and logic than otherwise would be required, to be used.

10 Claims, 1 Drawing Figure

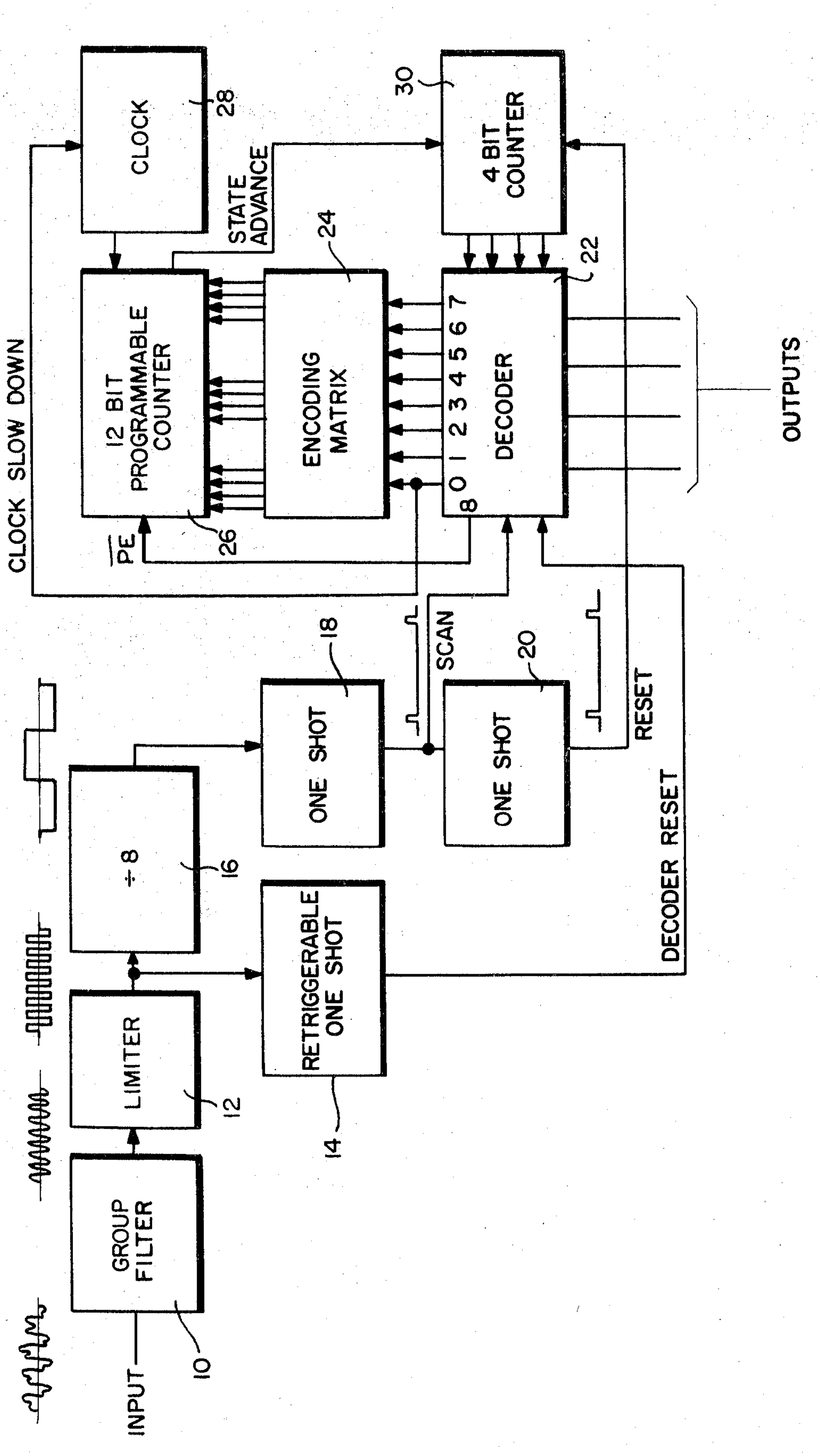
INPUT
GROUP FILTER
10
LIMITER
12
÷ 8
16
RETRIGGERABLE ONE SHOT
14
ONE SHOT
18
ONE SHOT
20
SCAN
RESET
DECODER RESET
12 BIT PROGRAMMABLE COUNTER
26
PE
CLOCK SLOW DOWN
CLOCK
28
STATE ADVANCE
ENCODING MATRIX
24
4 BIT COUNTER
30
DECODER
22
0 1 2 3 4 5 6 7
8
OUTPUTS

MULTI-FREQUENCY TONE DETECTOR

BACKGROUND OF THE INVENTION

This invention relates to a multi-frequency detector for use in decoding frequency coded decimal digits in a telephone system.

The particular type of telephone digit transmission system now gaining widest acceptance uses the so-called four-by-four code. This code embodies two groups of frequencies which will be called, for purposes of clarity, the high-frequency group and the low-frequency group. Each group of frequencies comprises four individual frequencies, and the concurrence of a selected pair of these frequencies, one from each group, represents a decimal digit. The generation of the frequencies representative of a particular digit may be accomplished by a multi-frequency tone dialer.

Two prime requirements of a multi-frequency tone detector, for use in the telephone plant, are good selectivity and rapid response. That is, the detector must be sufficiently selective as to guard against dial simulation (operation in the presence of a speech or other noise introduced at the telephone transmitter) and to provide an acceptable speed of service, the detector must be quick to respond to a valid tone signal.

DESCRIPTION OF THE PRIOR ART

One such multi-frequency detector is disclosed in U.S. Pat. No. 3,537,001. In this patent, a digital tone detector is utilized in decoding the frequency coded decimal digits used for signaling in a telephone system. Tone detection is accomplished by timing the intervals between alternate 0 crossing of the input tone wave form. To this end, a multi-stage binary counter is driven by a reference clock source of relatively high frequency. The counter is reset to 0 immediately after detection of a given first 0 crossing and subsequently "read" upon detection of the third or next alternative 0 crossing. The counter output state, at the instant the counter is read, determines the period of the wave form and hence the fundamental frequency of input tone signal. Decoder logic, connected in a predetermined manner to the counter output, establishes clock count bands which correspond to the recognition bandwidth limits of the multiplicity of tones to be detected. A distinct output indication of tone is provided if the count in the counter, at the read instant, falls within one of the clock count bands established by the decoder logic.

SUMMARY OF THE INVENTION

In accordance with the present invention, tone detection is accomplished with a digital tone detector by timing the interval or period of the input tone signal to determine its frequency. In the preferred embodiment, the timing, or counting, is accomplished over more than one period, eight periods in the illustrated embodiment, to reduce the effect of noise on detection of the frequency of the tone. To this end, a binary programmable counter is driven by a clock source, and is programmed to count clock pulses corresponding to eight times the minimum or maximum period of the respective tone signals. Each time the programmable counter clock pulses corresponding to eight times the minimum period of a tone signal, it is reset and programmed to count clock pulses corresponding to eight times the maximum period of the tone signal, in consecutive fashion. If the period of the detected tone signal ends before the programmable counter reaches a count corresponding to the minimum period, no output is provided. However, if the period ends before the programmable counter reaches a count corresponding to eight times the maximum period, the receipt of a valid tone is indicated. The programmable counter drives a state counter and advances the latter by one each time the count corresponding to eight times a minimum or maximum period is reached. The state of the state counter is decoded by decoder logic, and the latter provides a distinct output indication of the frequency of the tone, at the instant the period of the received tone ends, if it is a valid tone signal. The decoder logic also enables an encoding matrix, to re-program the programmable counter in accordance with the state of the state counter. By resetting the programmable counter each time it counts clock pulses corresponding to the upper or lower limit, i.e., the minimum or maximum period of a tone, a smaller counter and less memory and logic then otherwise would be required, particularly in comparison to the multi-frequency tone detector of the above-identified U.S. Pat. No. 3,537,001, can be used.

Accordingly, it is a primary object of the present invention to improve the detection of frequency coded decimal digits in telephone systems.

A further object is to provide a multi-frequency tone detector which can be as frequency selective as necessary, while at the same time being quick to respond to a valid signal.

A still further object is to provide a multi-frequency tone detector wherein timing or counting over more than one period of the incoming or detected frequency is utilized, to reduce the effect of noise on detection of the frequency of the tone.

A still further object is to provide an improved multi-frequency tone detector including a programmable counter which is reset each time it reaches the upper or lower limit of a tone, thus permitting a smaller counter and less memory and logic then would otherwise be required in similar detector, to be used.

Other objects of the invention will in part be obvious and will in part appear hereinafter.

BRIEF DESCRIPTION OF THE DRAWINGS

The single FIGURE is a detailed block diagram schematic of a multi-frequency tone detector in accordance with the principles of the present invention.

DETAILED DESCRIPTION

As indicated hereinbefore, the multi-frequency tone detector of the present invention is intended for use in a telephone signal arrangement wherein the digit-calling information is coded in the form of two frequencies in the voice frequency range, each chosen from a distinct group of frequencies, and transmitted simultaneously to the telephone central office. The total number of signal frequencies is eight, divided into two groups of four (i.e., a low frequency group and a high frequency group), and a valid signal is made up of one frequency from each group of four.

Because of manufacturing variations, temperature effects, etc., it has been found that the generated multi-frequency tones vary slightly from telephone to telephone. To account for this and maintain adequate discrimination against unwanted signals, a 5 percent recognition bandwidth has been settled upon. If a received signal tone falls within this limited bandwidth, it will be accepted as a valid tone.

The following table lists eight typical signal frequencies (Hz.) or tones to be detected and the 5 percent recognition bandwidth limits for each.

HIGH GROUP

| | | |
|---|---|---|
| 1179 | 1209 | 1239 |
| 1303 | 1336 | 1369 |
| 1440 | 1477 | 1514 |
| 1592 | 1633 | 1674 |

LOW GROUP

| | | |
|---|---|---|
| 680 | 697 | 714 |
| 751 | 770 | 789 |
| 831 | 852 | 873 |
| 917 | 941 | 965 |

The center columns give the nominal tones for the two groups.

The periods corresponding to the bandwidth limits for the high group are set forth in the table below.

| Nominal Tone, Hz | Band Edge Periods, microseconds | |
|---|---|---|
| 1633 | 597.4 | 628.1 |
| 1477 | 660.5 | 694.4 |
| 1336 | 730.2 | 767.7 |
| 1209 | 806.9 | 848.3 |

The minimum period for the 1633 Hz tone is 597.4 microseconds, but as indicated above, since an eight period count will be taken, the period is multiplied by eight, giving a count period of 4780 microseconds. The maximum period for the 1633 Hz tone is 628.1 microseconds and when multiplied by eight equals 5025 microseconds. By subtracting the 4780 from 5025, the time between the minimum and maximum period of 245 microseconds is obtained. Since the input was divided by eight, if a period ends before a count of 4780, it is invalid. If the period ends between 4780 microseconds and 5025 microseconds, it is a valid tone. A single clock can be used for measuring all four frequencies in a single group, since in a valid signaling sequence, only one tone of each group will be present at any given time. If two tones are present in a single group or if excessive interference of some nature accompanied the valid tone, the period of the tone would neither be constant nor of acceptable duration and detection would be prevented or inhibited, as will be evident hereinafter.

Referring now to the drawing, the tone signals generated at a subscriber location are received at a central office where the two groups are separated by means of a group filter 10 which may be a conventional filter to eliminate frequencies outside the desired group. The group filter 10 may be either a band reject filter to eliminate the other group of tones or bandpass filter which will pass only the tones of the desired group. The high and low groups of tones are then respectively delivered to separate digital tone detectors, such as shown in the drawing. Under normal operating conditions, the signal tones of a given group are presented sequentially to the detector circuit.

An incoming tone signal, of generally sinusoidal configuration, is applied to the limiter 12 which is used to give a constant level square wave input to the logic part of the detector circuit. The limiter 12 may be, for example, an operational amplifier with zener diodes in the feedback path to make it limit.

A retriggable one-shot multi-vibrator 14 is coupled to the output of the limiter 12 and is used to detect the presence of an output from the limiter 12. If the limiter 12 does not have an output which is present for the timing duration of the one-shot multi-vibrator 14, it returns to the zero state and resets the decoder 22, as more fully described below. The time of the one-shot multi-vibrator 14 is equal to two periods of the lowest valid frequency of the group of frequencies detected by the digital tone detector.

The output of the limiter 12 also is coupled to a divide-by-eight circuit 16 which may be comprised of, for example, three flip-flops. When the period of the output of the divide-by-eight circuit 16 is measured, it is an average of eight periods of the output of the limiter 12. By the averaging of eight periods, the detection is more immune to noise.

The output of the divide-by-eight circuit 16 is coupled to a pair of one-shot multi-vibrators 18 and 20 which are used to provide scan and reset pulses, respectively. When the output of the divide-by-eight circuit 16 goes low, the first one-shot multi-vibrator 18 gives a narrow pulse that is used to scan the decoder 22 to determine if the input to the detector was a valid tone. The second one-shot multi-vibrator 20 gives a narrow pulse at the end of the scan pulse that is used to reset the four bit binary counter 30.

The four bit binary counter 30 is used to indicate the state of the detector in binary code. The state of the binary counter 30 is advanced by the 12 bit programmable counter 26, and the binary counter 30 is reset by the reset pulse from the one-shot multi-vibrator 20.

The decoder 22 is a BCD to decimal decoder and output circuit. The decoder 22 provides inputs to the encoding matrix 24. The first state, 0, provides a "clock slow down" signal which is used to control the output of a clock 28 and the last state, 8, stops the 12 bit programmable counter 26, as more fully described below.

The output circuitry of the decoder 22 checks for coincidence between the scan and four valid decoder states. If such a coincidence exists for two consecutive scan pulses, an output one-shot multi-vibrator is triggered giving an output pulse, to give the frequency of the detected tone signal, as more fully described below.

The decoder 22 output states are encoded by the encoding matrix 24 into a BCD code for programming the 12 bit programmable counter 26. The truth table for the encoding matrix 24 is set forth in the table below.

| | 0 | 1 | 2 | 3 | 4 | 5 | 6 | 7 | 8 |
|---|---|---|---|---|---|---|---|---|---|
| 1 | | X | | X | X | | | X | |
| 2 | X | | | X | X | | X | X | |
| 4 | X | X | X | X | X | X | | | |
| 8 | | | | X | X | X | X | X | |
| 16 | X | X | | | X | | X | | |
| 32 | | X | | | | X | X | | |
| 64 | X | X | | | | | | X | |
| 128 | | X | | | | | | | |
| 256 | X | | X | X | X | X | X | X | |
| 512 | | | | | | | | | |
| 1024 | | | | | | | | | |
| 2048 | X | | | | | | | | |
| ÷2 | X | | | | | | | | |
| $\overline{PE}$ | | | | | | | | | X |

The clock 28 produces clock pulses at either a 1MHz or a 0.5 MHz rate, depending on the state of the decoder 22. The clock 28 may be a 1 MHz crystal controlled oscillator, and its output frequency is determined by the "clock slow down" signal from the decoder 22. More particularly, when the decoder 22 is in its 0 state, a "clock slow down" signal is coupled to the clock 28 to provide an output frequency of 0.5 MHz, with each clock pulse then being 2 microseconds. In each of the other states of the decoder 22, the clock 28 operates at its 1 MHz frequency.

The 12 bit programmable counter 26 will count at the clock rate to the number preset or programmed therein by the encoding matrix 24. When the programmed count number is reached, an output pulse termed a "state advance" pulse is coupled to the binary counter 30 to advance by 1 the count of the latter. During the "state advance" pulse, the programmable counter 26 is reprogrammed to count a new number. If the $\overline{PE}$ is at logic 0, the programmable counter is inhibited to prevent further counting.

In operation, as indicated above, an incoming tone signal is applied to the limiter 12 which provides a constant level square wave input to the retriggable one-shot multi-vibrator 14 and the divide-by-eight circuit 16. The one-shot multi-vibrator 14, upon detecting the presence of an output from the limiter 12, provides a "decoder reset" pulse to the decoder 22 to reset the counters in the latter's output circuitry.

The output from the divide-by-eight circuit 16 is coupled to the one-shot multi-vibrator 18 to provide a scan pulse and to the one-shot multi-vibrator 20 to provide a reset pulse to reset the binary counter 30.

Now, assume that the input to the decoder is a tone of 1633 MHz and thus has a period of 612.4 microseconds. After multiplying by eight, the period is 4899 microseconds which would be the time between reset pulses. As indicated above, the maximum period for the 1633 Hz tone when multiplied by eight is 5025 microseconds and the minimum period is 4780 microseconds. Accordingly, if the period ends between 4780 and 5025 microseconds, it is a valid tone.

When the first reset pulse from the one-shot multi-vibrator 20 occurs, the binary counter 30 is set to 0. The decoder 22 converts the binary output from the binary counter 30 to a 1 out of 10 output corresponding to the 0 state.

During the 0 state, the encoding matrix 24 programs the programmable counter 26 to count to 2390, and the "clock slow down" pulse from the decoder 22 causes the clock 28 to operate at 0.5 MHz. Since the clock frequency is 0.5 MHz, each count equals 2 microseconds. When the programmable counter 26 counts to 2390, a period of 4780 microseconds has elapsed, which corresponds to the minimum period of the 1633 Hz tone.

When the count of 2390 is reached by the programmable counter 26, the latter couples the "state advance" pulse to the binary counter 30, to advance its count to state 1. The output of the binary counter 30 is decoded by the decoder 22, and its state outputs are encoded by the encoding matrix 24 for programming the programmable counter 26 to count to 245. When the decoder 22 advances to the state 1, the "clock slow down" pulse is removed and the clock rate is increased to 1 MHz.

When a count of 119 is reached by the programmable counter 26, the counting period ends (4780 plus 119 equals 4899, the period of the 1633 Hz tone) and a scan pulse is generated by the one-shot multi-vibrator 18 to scan the decoder 22 to see what state it is in. Immediately after the scan pulse, the one-shot multi-vibrator 20 produces a reset pulse to reset the binary counter 30 to 0, and the sequence is repeated.

Each time the outputs of the decoder 22 are scanned, if an output exists, the counter for that output is advanced by 1. When a count of 2 is reached, a corresponding output one-shot multi-vibrator is triggered providing a 50 millisecond output, and all other outputs are inhibited until reset at the end of the tone burst.

For an input tone having a greater period, i.e., a lower frequency in a group of frequencies, the programmable counter 26 is programmed to count a higher count before the decoder 22 is scanned. The table below lists the states of the decoder 22, the number the counter is programmed to count to, and what output if any corresponds to each state.

| State | Counter programmed to count to | Output |
|---|---|---|
| 0 | 4780 | None |
| 1 | 245 | 1633 |
| 2 | 260 | None |
| 3 | 271 | 1477 |
| 4 | 287 | None |
| 5 | 300 | 1336 |
| 6 | 314 | None |
| 7 | 331 | 1209 |
| 8 | $\overline{PE}$ low | None |

If the decoder reaches state 8, programmable counter 26 is inhibited by the $\overline{PE}$ pulse coupled to it.

More particularly, if the programmable counter, when the binary counter 30 or decoder 22 is in state 1, reaches the count of 245, the binary counter 30 is again advanced by the "state advance" pulse from the programmable counter 26, to state 2. Simultaneously, the output of the binary counter 30 is decoded by the decoder 22 and the programmable counter 26 is programmed by the encoding matrix 24 to count to 260 which is in the minimum period (4780 plus 260) for the 1477 Hz tone. If the period of the detected tone ends before the programmable counter reaches a count of 260, the tone is invalid and no output is provided by the decoder 22, when it is scanned.

If the programmable counter reaches a count of 260, the state of the binary counter 30 again is advanced by the "state advance" pulse, to state 3 and the programmable counter 26 is programmed to count to 271, in the manner described above. The count of 271 corresponds to the maximum period of the 1477 Hz tone (4780 plus 271). If the period of the detected tone ends before the programmable counter reaches the count of 271, the output of the decoder 22 when scanned will indicate the receipt of a valid 1477 Hz tone.

From the above it can be seen that the programmable counter 26 is reset each time it reaches the upper or lower limit, or minimum or maximum period, of a tone signal. The state of the binary counter 30 is progressively advanced through the states 0 through 8, at which time the count of the programmable counter 26 is inhibited by the $\overline{PE}$ pulse from the decoder 22. When in state 1, 3, 5 and 7, the state of the binary counter 30 is decoded by the decoder 22 to provide an output indication of the receipt of a 1633, 1477, 1336 and 1209 Hz tone signal, respectively.

From the above description, it can be seen from the description of the digital tone detector that it measures the period of a tone to determine its frequency, with the measured period being the average of eight periods, so that the effect of noise on detection of the frequency of the tone is substantially reduced. Also, by resetting the counter when it reaches the minimum or maximum period of a tone, a smaller counter and less memory and logic is required, in comparison to other similar tone detectors.

It will thus be seen that the objects set forth above, among those made apparent from the preceding description are efficiently attained and certain changes may be made in the above construction. Accordingly, it is intended that all matter contained in the above description or shown in the accomapnying drawings shall be interpreted as illustrative and not in a limiting sense.

Now that the invention has been described, what is claimed as new and desired to be secured by Letters Patent is:

1. A multi-frequency tone detector comprising:

a. a programmable counter;

b. a source of clock pulses for providing clock pulses to said programmable counter at an established rate;

c. decoder output means coupled to and serving to program said programmable counter to establish recognition bandwidth limits for a plurality of tone signals in accordance with its output state;

d. means for setting the output state of said decoder output means to an initial state immediately upon the occurrence of an input wave form;

e. means operated by said programmable counter for advancing the output state of said decoder output means each time clock pulses corresponding to a programmed lower or upper bandwidth limit of a tone signal are counted, whereby said programmable counter each time it reaches a count corresponding to the lower or upper bandwith limit of a tone signal advances the output state of said decoder output means and is reset by the latter in accordance with its output state; and f. means for reading the output state of said decoder output means at the end of the period of said input wave form, the output state of said decoder output means providing a distinct indication of the frequency of a valid input tone signal.

2. The multi-frequency detector of claim 1, further including means for multiplying the period of said input wave form, whereby the measured period of said input wave form is the sum of a plurality of periods, said programmable counter being programmed to count clock pulses in corresponding fashion.

3. The multi-frequency detector of claim 2, wherein the measured period is eight periods.

4. The multi-frequency detector of claim 2, wherein said means operated by said programmable counter for advancing the output state of said decoder output means comprises a state counter in the form of a binary counter.

5. The multi-frequency detector of claim 4, wherein said decoder output means comprises a BCD to decimal decoder including output means which when read provide a distinct indication of the frequency of a valid input tone signal, said BCD to decimal decoder decoding the output of said binary state counter to provide a plurality of output states.

6. The multi-frequency detector of claim 2, further including encoder means coupled between said decoder output means and said programmable counter for programming the latter in accordance with the output state of said decoder output means.

7. The multi-frequency detector of claim 1, wherein said source of clock pulses is operable under the control of said decoder output means to provide clock pulses to said programmable counter at a first rate when said decoder output means is in said initial state, and at a second rate when said decoder output means is in a state other than said initial state.

8. The multi-frequency detector of claim 1, wherein said decoder output means when in a predetermined state inhibits said programmable counter to prevent it from counting.

9. The multi-frequency of claim 2, further including means for resetting the output circuitry of said decoder output means if the period of said input wave form ends before a pre-established time.

10. The multi-frequency detector of claim 4, further including means for resetting said state counter each time an input wave form is received.

* * * * *